(12) United States Patent
Bergeron

(10) Patent No.: US 10,678,745 B2
(45) Date of Patent: Jun. 9, 2020

(54) PROVIDING COMPUTING DEVICE CONFIGURATION INFORMATION VIA A LIGHT TRANSMISSION

(71) Applicant: Keysight Technologies Singapore (Sales) Pte. Ltd., Singapore (SG)

(72) Inventor: Matthew Ryan Bergeron, Thousand Oaks, CA (US)

(73) Assignee: Keysight Technologies Singapore (Sales) Pte. Ltd., Singapore (SG)

( * ) Notice: Subject to any disclaimer, the term of this patent is extended or adjusted under 35 U.S.C. 154(b) by 104 days.

(21) Appl. No.: 15/589,617

(22) Filed: May 8, 2017

(65) Prior Publication Data

US 2018/0322089 A1    Nov. 8, 2018

(51) Int. Cl.
| | | |
|---|---|---|
| G06F 15/177 | (2006.01) | |
| H04L 12/24 | (2006.01) | |
| H04L 29/06 | (2006.01) | |
| H04W 24/08 | (2009.01) | |
| H04B 10/077 | (2013.01) | |
| G02B 5/20 | (2006.01) | |
| H04B 10/114 | (2013.01) | |

(Continued)

(52) U.S. Cl.
CPC .......... G06F 15/177 (2013.01); G02B 5/208 (2013.01); G06F 15/76 (2013.01); H04B 10/0773 (2013.01); H04B 10/114 (2013.01); H04B 10/116 (2013.01); H04L 41/04 (2013.01); H04L 41/0806 (2013.01); H04L 41/0893 (2013.01); H04L 63/0236 (2013.01); H04W 24/08 (2013.01)

(58) Field of Classification Search
CPC . H04L 41/0806; H04L 41/04; H04L 63/0236; H04L 41/0893; G06F 15/177; G06F 15/76; H04B 10/116; H04B 10/114; H04B 10/0773; G02B 5/208; H04W 24/08

See application file for complete search history.

(56) References Cited

U.S. PATENT DOCUMENTS

| | | | |
|---|---|---|---|
| 4,491,971 A | 1/1985 | Webb et al. | |
| 5,251,907 A | 10/1993 | Ady | |
| 5,929,777 A | 7/1999 | Reynolds | |

(Continued)

FOREIGN PATENT DOCUMENTS

| | | |
|---|---|---|
| EP | 2 778 627 A2 | 9/2014 |
| WO | WO 2013/020110 A2 | 2/2013 |
| WO | WO 2014/144948 A1 | 9/2014 |

OTHER PUBLICATIONS

Non-Final Office Action for U.S. Appl. No. 15/067,128 (dated Jul. 26, 2017).

(Continued)

Primary Examiner — Jimmy H Tran

(57) ABSTRACT

Methods, systems, and computer readable media for providing computing device configuration information via a light transmission are disclosed. According to one method, the method occurs at a computing device. The method includes receiving configuration information including an internet protocol (IP) address assigned by a network node. The method also includes sending a transmission including the configuration information, wherein the configuration information includes the IP address, wherein the transmission includes either a visible light transmission or an infrared (IR) transmission.

18 Claims, 4 Drawing Sheets

(51) Int. Cl.
G06F 15/76 (2006.01)
H04B 10/116 (2013.01)

(56) References Cited

U.S. PATENT DOCUMENTS

| | | | |
|---|---|---|---|
| 6,088,586 A | 7/2000 | Haverty | |
| 7,248,933 B2 | 7/2007 | Wildman | |
| 7,317,377 B2 | 1/2008 | Galperin et al. | |
| 7,356,679 B1 | 4/2008 | Le et al. | |
| 7,525,980 B2* | 4/2009 | Koch | H04L 29/12283 370/420 |
| 7,605,699 B2 | 10/2009 | Tanaka | |
| 7,648,070 B2 | 1/2010 | Droms et al. | |
| 7,848,905 B2 | 12/2010 | Troxler et al. | |
| 7,890,723 B2 | 2/2011 | LaPedis et al. | |
| 7,934,660 B2 | 5/2011 | Yeakley et al. | |
| 8,395,506 B2 | 3/2013 | Elledge | |
| 8,503,328 B2* | 8/2013 | Tian | H04W 48/12 370/254 |
| 8,768,171 B2* | 7/2014 | Schenk | H05B 47/19 398/130 |
| 8,954,292 B2 | 2/2015 | Troxler | |
| 9,173,066 B1 | 10/2015 | Jain et al. | |
| 9,525,486 B2* | 12/2016 | Poola | H05B 47/19 |
| 9,614,614 B2 | 4/2017 | Bergeron | |
| 9,696,343 B2 | 7/2017 | Ripp et al. | |
| 9,706,426 B2* | 7/2017 | Poola | H04L 61/6077 |
| 9,722,701 B2* | 8/2017 | Castor | H04W 48/16 |
| 9,980,121 B2* | 5/2018 | Lee | H04W 48/14 |
| 10,165,390 B2 | 12/2018 | Desdier et al. | |
| 10,210,750 B2* | 2/2019 | Knapp | G08C 23/04 |
| 10,341,016 B2* | 7/2019 | Rong | H04B 10/116 |
| 2001/0034223 A1 | 10/2001 | Rieser et al. | |
| 2003/0034887 A1 | 2/2003 | Crabtree et al. | |
| 2005/0018681 A1* | 1/2005 | Koch | H04L 29/12283 370/392 |
| 2005/0111380 A1* | 5/2005 | Adrangi | H04L 61/2015 370/254 |
| 2006/0074513 A1 | 4/2006 | DeRose et al. | |
| 2007/0002761 A1* | 1/2007 | Diamant | H04L 29/12009 370/252 |
| 2007/0020969 A1 | 1/2007 | Yungers | |
| 2007/0121649 A1 | 5/2007 | Cicchetti et al. | |
| 2008/0129459 A1 | 6/2008 | Bailly et al. | |
| 2009/0091442 A1 | 4/2009 | Howarth et al. | |
| 2009/0207027 A1 | 8/2009 | Banerjee et al. | |
| 2010/0127828 A1 | 5/2010 | Connolly et al. | |
| 2010/0329691 A1* | 12/2010 | Schenk | H05B 47/19 398/130 |
| 2011/0050421 A1 | 3/2011 | Duron et al. | |
| 2011/0211827 A1* | 9/2011 | Soto | H04B 10/071 398/25 |
| 2012/0005344 A1 | 1/2012 | Kolin et al. | |
| 2013/0215467 A1 | 8/2013 | Fein et al. | |
| 2013/0308229 A1 | 11/2013 | Faxvog et al. | |
| 2014/0016926 A1* | 1/2014 | Soto | H04B 10/0775 398/16 |
| 2014/0094124 A1* | 4/2014 | Dave | H04W 8/005 455/41.2 |
| 2014/0153513 A1* | 6/2014 | Lee | H04L 61/203 370/329 |
| 2014/0281304 A1 | 9/2014 | Hoffman | |
| 2015/0065046 A1* | 3/2015 | Wilfred | H04W 76/14 455/41.2 |
| 2015/0125144 A1 | 5/2015 | Bergeron | |
| 2015/0201358 A1* | 7/2015 | Barkan | H04W 12/08 370/331 |
| 2015/0253885 A1* | 9/2015 | Kagan | G06F 16/248 368/10 |
| 2016/0025784 A1 | 1/2016 | Ripp et al. | |
| 2016/0054962 A1* | 2/2016 | Park | H04L 41/0806 358/1.15 |
| 2016/0165380 A1* | 6/2016 | Kwan | H04W 52/0251 455/41.1 |
| 2016/0242108 A1* | 8/2016 | Kim | H04W 76/14 |
| 2016/0255664 A1* | 9/2016 | Li | H04W 76/10 370/329 |
| 2016/0258761 A1* | 9/2016 | Jovicic | G01C 21/206 |
| 2016/0267310 A1* | 9/2016 | AlNasser | G06K 7/10009 |
| 2016/0353557 A1* | 12/2016 | Siegel | H05B 47/16 |
| 2017/0032841 A1* | 2/2017 | Guillanneuf | G11C 13/04 |
| 2017/0041886 A1* | 2/2017 | Baker | H04W 4/029 |
| 2017/0054795 A1* | 2/2017 | Inoue | H04L 61/2015 |
| 2017/0063458 A1* | 3/2017 | Miyaho | H04B 10/116 |
| 2017/0265021 A1 | 9/2017 | Desdier et al. | |
| 2017/0289735 A1* | 10/2017 | Rajapaksa | H04W 12/04 |
| 2017/0331681 A1* | 11/2017 | Willis | H04L 41/0806 |
| 2018/0013719 A1* | 1/2018 | Butler | H04L 61/2007 |
| 2018/0248621 A1* | 8/2018 | Lenssen | H04B 10/5563 |
| 2018/0283171 A1* | 10/2018 | Bhongale | H04J 14/02 14/2 |

OTHER PUBLICATIONS

Notice of Allowance and Fee(s) Due for U.S. Appl. No. 14/199,502 (dated Dec. 7, 2016).

Notice of Allowance and Fee(s) Due for U.S. Appl. No. 14/199,502 (dated Jul. 7, 2016).

Commonly-assigned, co-pending U.S. Appl. No. 15/067,128 for "Methods, Systems and Computer Readable Media for Management of Passive Network Taps Using Radio Frequency Identification (RFID)," (Unpublished, Mar. 10, 2016).

Non-Final Office Action for U.S. Appl. No. 14/199,502 (dated Jan. 4, 2016).

Notice of Allowance and Fee(s) Due and Examiner Initiated Interview Summary for U.S. Appl. No. 14/341,031 (dated Feb. 28, 2017).

Non-Final Office Action for U.S. Appl. No. 14/341,031 (dated Jun. 23, 2016).

Restriction and/or Election Requirement for U.S. Appl. No. 14/341,031 (dated Feb. 2, 2016).

"Flat-Out, the Thinnest 8 Station GigaBit Fiber Tap HD8," Net Optics, Inc. https://www.netoptics.com/products/network-taps/gigabit-fiber-tap-hd8 pp. 1-2 (Feb. 25, 2012).

Wessel, Rhea, "T-Systems, Intel Test RFID to Track Servers at Model Data Center," RFID Journal, pp. 1-2 (Feb. 2012).

Thibodeau, Patrick, "Finding lost IT with RFID," Computerworld, pp. 1-3 (Oct. 2010).

Notice of Allowance and Fee(s) Due for U.S. Appl. No. 15/067,128 (dated Aug. 15, 2018).

Advisory Action for U.S. Appl. No. 15/067,128 (dated Apr. 9, 2018).

Final Office Action for U.S. Appl. No. 15/067,128 (dated Jan. 22, 2018).

* cited by examiner

PROVIDING COMPUTING DEVICE CONFIGURATION INFORMATION VIA A LIGHT TRANSMISSION

TECHNICAL FIELD

The subject matter described herein relates to network configuration. More specifically, the subject matter relates to methods, systems, and computer readable media for providing computing device configuration information via a light transmission.

BACKGROUND

Various technical facilities, such as data centers and research laboratories, are typically filled with computing devices, e.g., production, storage, and testing equipment. In some cases, these facilities may be as large as a warehouse in order to accommodate the numerous data storage servers and testing computers. In these such environments, determining configuration information for a particular computing device (e.g., a card, a port, a module, a component, etc.) of small size from among the thousands of possibilities can be extremely burdensome and time consuming for a facility operator or administrator. Notably, such a task becomes of critical importance when communications with a particular computing device is needed to prevent or mitigate issues that can cause considerable cost and expense.

SUMMARY

Methods, systems, and computer readable media for providing computing device configuration information via a light transmission are disclosed. According to one method, the method occurs at a computing device. The method includes receiving configuration information including an internet protocol (IP) address assigned by a network node. The method also includes sending a transmission including the configuration information, wherein the configuration information includes the IP address, wherein the transmission includes either a visible light transmission or an infrared (IR) transmission.

According to one system for providing computing device configuration information via a light transmission, the system includes at least one processor. The system also includes a computing device implemented using the at least one processor. The computing device is configured for receiving configuration information including an IP address assigned by a network node and sending a transmission including the configuration information, wherein the configuration information includes the IP address, wherein the transmission includes either a visible light transmission or an IR transmission.

The subject matter described herein may be implemented in software in combination with hardware and/or firmware. For example, the subject matter described herein may be implemented in software executed by a processor (e.g., a hardware-based processor). In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein. In some embodiments, a module may include a field-programmable gateway array (FPGA), an application-specific integrated circuit (ASIC), or a processor.

BRIEF DESCRIPTION OF THE DRAWINGS

The subject matter described herein will now be explained with reference to the accompanying drawings of which.

DETAILED DESCRIPTION

Figure 1:
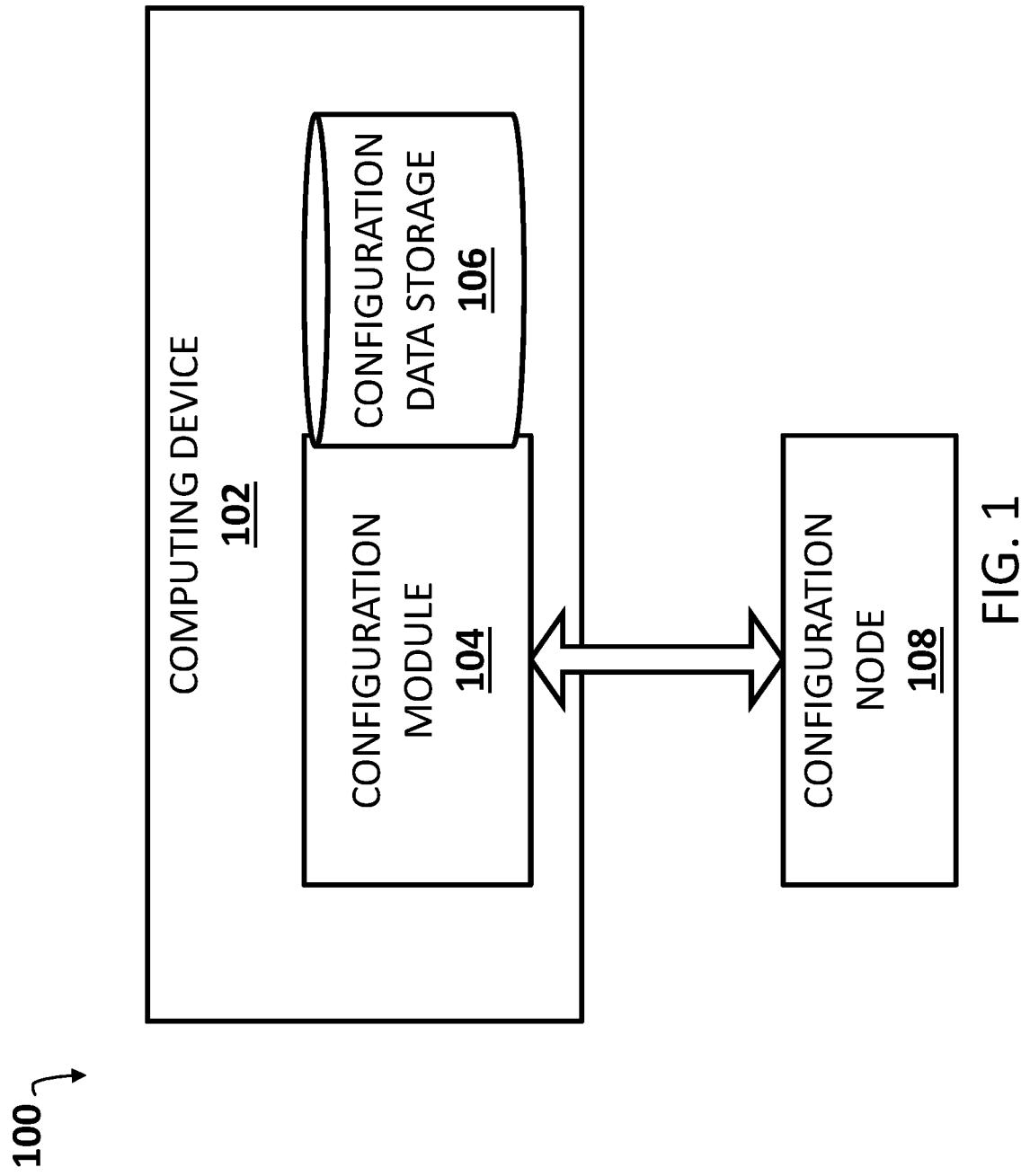
FIG. 1 is a diagram illustrating an example communications environment.

The subject matter described herein relates to methods, systems, and computer readable media for providing computing device configuration information via a light transmission. Various technical facilities, such as data centers and research laboratories, may include numerous computing devices (e.g., blade servers, platforms, modules, etc.) in a limited amount of space. While some computing devices may include a display, e.g., a liquid crystal display (LCD), for displaying configuration data, e.g., a serial number, a network address (e.g., an internet protocol (IP) address), a name, status information, and/or other information; other computing devices may lack a display. However, even with displays, determining configuration information for a particular computing device (e.g., a card, a port, a module, etc.) of small size from among many computing devices can be extremely burdensome and time consuming for a facility operator or administrator.

In accordance with some aspects of the subject matter described herein, equipment, techniques, methods, or mechanisms are disclosed for providing computing device configuration information via a light transmission. For example, a computing platform or a module in accordance with one or more aspects described herein may transmit configuration information using a light-emitting diode (LED) or another light emitter. In this example, a receiver node, such as a smartphone, with a camera may be configured for receiving the light transmission, deriving the configuration information from the light transmission, and/or displaying, via a display, e.g., an LCD, the configuration information.

In accordance with some aspects of the subject matter described herein, equipment, techniques, methods, or mechanisms are disclosed for using configuration information derived from a light transmission to contact a computing device or another device for obtaining additional information associated with the computing device. For example, a receiver device (e.g., a smartphone or tablet computer) in accordance with one or more aspects described herein may receive and derive the configuration information from a light transmission. In this example, the receiver device may use an IP address associated with the derived configuration information to contact a computing device or another device (e.g., a central management server) to obtain additional information associated with the computing device.

Advantageously, in accordance with some aspects of the subject matter described herein, a computing device can use light transmissions for providing IP addresses and/or other configuration information. By using light transmissions, a computing device without a screen or display may provide configuration information to operators and/or entities. For example, an IR handheld detector may be able to filter out of visible light and interpret data in a light transmission from a computing device lacking a display and the IR handheld device may then display the data to a user. Further, light transmissions, e.g., IR transmissions, may communicate data to a receiver device in an unobtrusive and/or benign way. For example, the emission of IR light allows for a better user experience since it reduces the number of visible blinking lights and allows for multiple people to determine configuration information for multiple computing devices using receiver devices. In this example, because IR transmissions are not detectable by the human eye, the user experience is not degraded.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an example communications environment 100. In some embodiments, communications environment 100 may include one or more networks and/or network nodes. For example, communications environment 100 may represent one or more networks that include multiple computing devices, e.g., routers, servers, cards, modules, blades.

Referring to FIG. 1, communications environment 100 may include a computing device 102 and a configuration node 108. Computing device 102 may be any suitable entity (e.g., software executing on at least one processor) for performing one or more applications or functions. Example computing devices may include a network node, a web server, a communications interface card or module, a blade server, an internet of things (IoT) device (e.g., a smart (e.g., internet enabled) toaster, a smart refrigerator, a smart toy, a smart light switch, a smart thermostat, a smart home, a smart vehicle, a smart building, etc.), a consumer device (e.g., a smartphone, a tablet computer, etc.), and/or a computing platform.

In some embodiments, computing device 102 may include functionality for communicating via a network address and/or using various communication protocols. For example, computing device 102 may include one or more communications interfaces for receiving and/or sending messages associated with one or more network layer protocols (e.g., IP); one or more transport layer protocols (e.g., transmission control protocol (TCP), a user datagram protocol (UDP), stream control transmission protocol (SCTP), and/or reliable data protocol (RDP)); and/or one or more session layer protocols.

Computing device 102 may include a configuration module 104 and a configuration data storage 106. Configuration module 104 may be any suitable entity (e.g., software executing on at least one processor) for performing one or more aspects associated with receiving, storing, and/or sending configuration information. For example, configuration module 104 may communicate with a dynamic host configuration protocol (DHCP) server or another entity for receiving a network address (e.g., an IP address) and/or other configuration information. In some embodiments, configuration information receivable, storable, and/or sendable by configuration module 104 may include dynamic information (e.g., a dynamically assigned IP address and/or port) that may change and static information (e.g., an equipment or device identifier) that may change rarely or not at all. Example configuration information may include an IP address, a media access control (MAC) address, a parameter, a setting, application data, a serial number, a device identifier, an application protocol, a port number, an error code, an error message, status information, and/or a software version number.

In some embodiments, configuration module 104 may store configuration data in configuration data storage 106. Configuration data storage 106 may be any suitable entity or entities (e.g., a storage device, a non-transitory computer readable medium, or a storage system) for maintaining or storing configuration information and/or other information associated with computing device 102. For example, configuration data storage 106 may include a dynamically assigned network address from configuration node 108. In another example, configuration data storage 106 may include status information regarding operational health of computing device 102 determinable by software and/or analytics therein. In some embodiments, configuration data storage 108 may be located at or accessible computing device 102, configuration module 104, and/or another node or module. In some embodiments, configuration data storage 108 may be distributed across multiple platforms or devices.

In some embodiments, computing device 102 and/or modules therein (e.g., configuration module 104) may include functionality for communicating with configuration node 108 to receive a network address (e.g., an IP address) and/or other configuration information. Configuration node 108 may be any suitable entity (e.g., software executing on at least one processor) for performing one or more aspects associated with providing configuration information. For example, configuration node 108 may include a DHCP server. In this example, after receiving a DHCP request from computing device 102, configuration node 108 may send, to computing device 102, a DHCP response that includes an IP address. In another example, configuration node 108 may be a data provisioning server and may provide configuration information and/or other data, such as system parameters or application settings, to computing device 102 or configuration module 104 using one or more communication protocols.

It will be appreciated that FIG. 1 is for illustrative purposes and that various nodes and/or modules, locations, and/or functionality described above in relation to FIG. 1 may be changed, altered, added, or removed.

Figure 2:
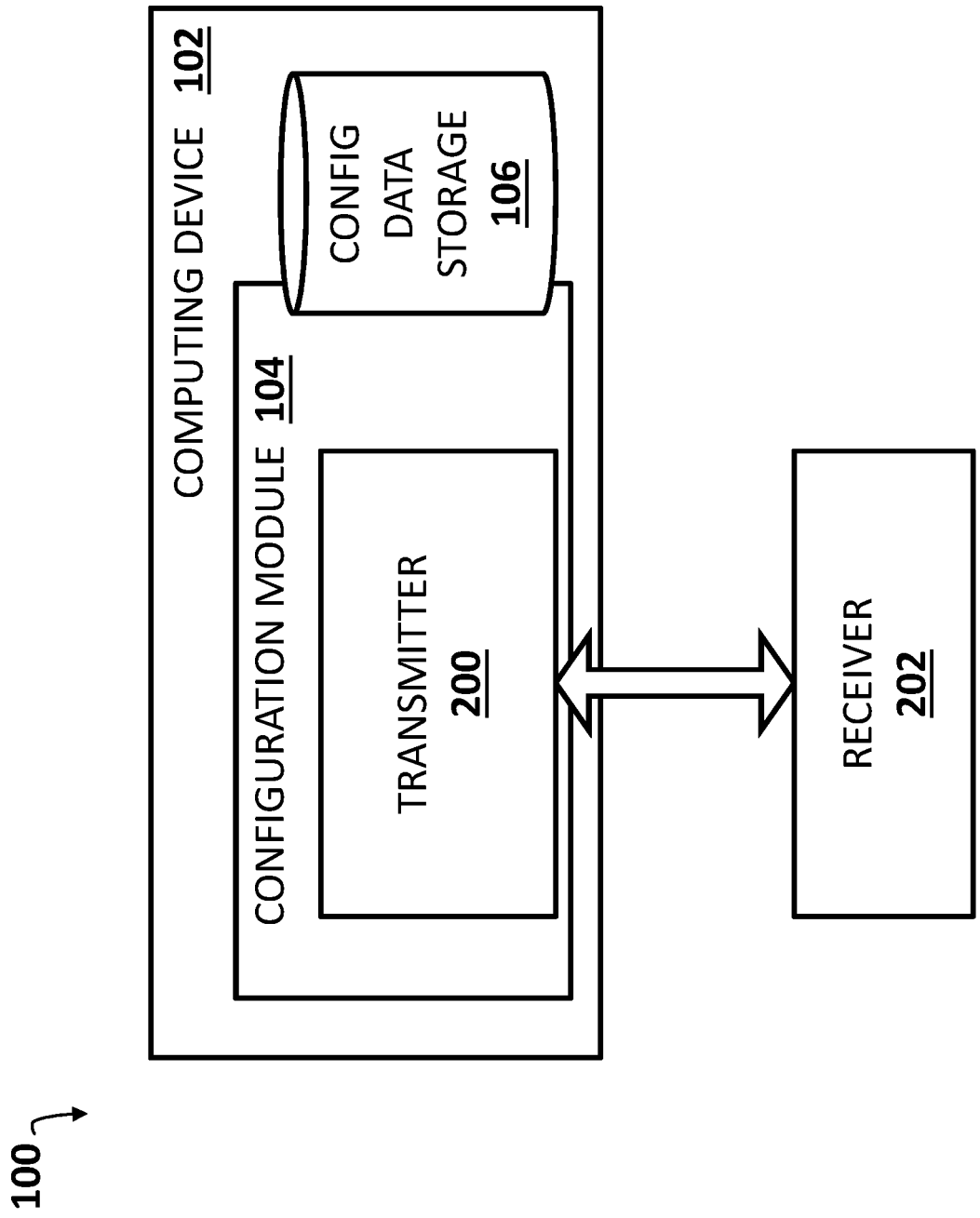
FIG. 2 is a diagram illustrating an example computing device for providing computing device configuration information via a light transmission.

FIG. 2 is a diagram illustrating computing device 102 for providing computing device configuration information via a light transmission. Referring to FIG. 2, computing device 102 may include configuration module 104, configuration data storage 106, and a transmitter 200.

Transmitter 200 may be any suitable entity (e.g., software executing on at least one processor) for sending data via light transmissions. In some embodiments, transmitter 200 may include a light emitter or any hardware circuit device or component configured to emit light using a light source. For example, transmitter 200 may use an IR LED for transmitting an IR transmission. In another example, transmitter 200 may use a visible spectrum LED for transmitting a visible light transmission. In some embodiments, transmitter 200 or a related light emitter might be repurposed from another LED already present in the system (e.g., utilizing an existing LED device or module for another purpose).

Receiver 202 may be any suitable entity (e.g., software executing on at least one processor) for receiving and interpreting or deriving data from light transmissions. In some embodiments, receiver 202 may include a camera or any hardware circuit device or component configured to detect and interpret light transmissions. For example, receiver 202 or a component therein may detect, record, analyze, and/or interpret an IR transmission. In this example, receiver 202 or a component therein may derive, decode, or interpret various data from the IR transmission. In another example, receiver 202 or a component therein may detect, record, analyze, and/or interpret a visible light transmission. In this example, receiver 202 or a component therein may derive, decode, or interpret various data from the visible light transmission.

In some embodiments, transmitter 200 may send light transmissions using various modulation schemes and/or techniques. Example modulation schemes and/or techniques usable by transmitter 200 and/or receiver 202 may include pulse position modulation (PPM), pulse width modulation (PWM), pulse distance modulation (PDM), biphase modulation, amplitude-shift keying (ASK) modulation, or frequency-shift keying (FSK) modulation. For example, transmitter 200 may be configured to emit a series of IR pulses or a pulse train in a manner that conveys configuration information (e.g., an IP address, an error code, and/or a device identifier). In another example, transmitter 200 may be configured to emit a series of visible light pulses or a pulse train in a manner that conveys configuration information (e.g., an IP address, an error code, and/or a device identifier).

In some embodiments, transmitter 200 and receiver 202 may communicate data using other technologies, such as radio frequency (RF), Bluetooth, sonar, and/or Wi-Fi ad-hoc technologies. For example, receiver 202 may use RF or another technology to indicate proximity or presence to transmitter 200 and, in response, transmitter 200 may send configuration data or other information using RF or another technology in conjunction with or in lieu of light transmissions.

It will be appreciated that FIG. 2 is for illustrative purposes and that different and/or additional information may be used for providing computing device configuration information via a light transmission and/or related actions.

Figure 3:
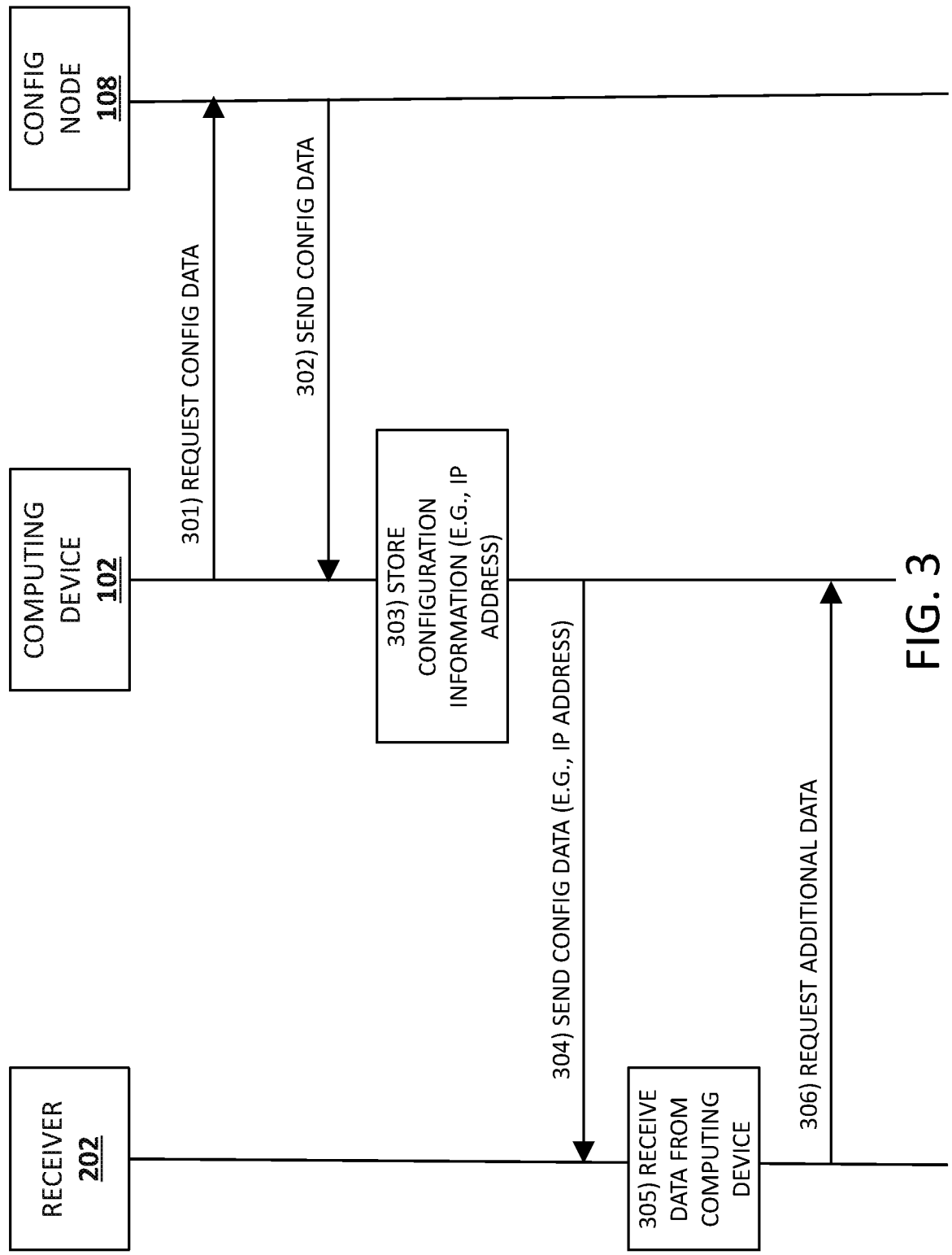
FIG. 3 is a diagram illustrating example communications for providing computing device configuration information via a light transmission.

FIG. 3 is a diagram illustrating example communications for providing computing device configuration information via a light transmission. In some embodiments, computing device 102 may request and receive configuration information from configuration node 108. In some embodiments, computing device 102 or modules therein may transmit or send configuration information to a receiving entity via a light transmission and/or using other technologies.

Referring to FIG. 3, in step 301, computing device 102 or configuration module 104 therein may request configuration information from configuration node 108. For example, computing device 102 or configuration module 104 therein may send a DHCP request for requesting a network address for use by computing device 102.

In step 302, configuration node 108 may send configuration information to computing device 102 or configuration module 104 therein. For example, in response to receiving a DHCP request from computing device 102 or configuration module 104 therein, configuration node 108 may send a DHCP response containing a network address to computing device 102 or configuration module 104 therein.

In step 303, computing device 102 or configuration module 104 therein may receive and store configuration information. For example, after receiving a network address from configuration node 108, computing device 102 or configuration module 104 therein may store the IP address in configuration data storage 106.

In some embodiments, computing device 102 or configuration module 104 therein may store information derived or generated by various entities. For example, computing device 102 or configuration module 104 therein may store operational status information, e.g., error codes or message.

In some embodiments, computing device 102 or configuration module 104 therein may consistently send light transmissions. For example, configuration module 104 therein may send light transmissions containing configuration information in regularly intervals or irregular intervals. In this example, configuration module 104 therein may be configured to change or modify when or how often light transmission are sent.

In some embodiments, computing device 102 or configuration module 104 therein may be triggered or provoked to send light transmissions, e.g., using network messages. For example, receiver 202 or an application executing therein may send a broadcast message to nodes (e.g., computing devices) in one or more networks for initiating light transmissions containing configuration information. In this example, in response, configuration module 104 therein may send light transmissions containing configuration data in regularly intervals or irregular intervals for a predetermined amount of time. In some embodiments, configuration module 104 therein may be configured (e.g., by a datacenter operator or a receiver user) to change or modify the effects of such a broadcast message.

In some embodiments, computing device 102 or configuration module 104 therein may be triggered or provoked to send light transmissions, e.g., based on reader proximity. For example, receiver 202 or an application executing therein may use Bluetooth, RF, Wi-Fi ad-hoc, sonar, and/or other technology to trigger a particular computing device to send light transmissions. In this example, depending on the technology, the trigger event may occur when receiver 202 is nearby (e.g., 5-10 feet), thereby limiting the number of computing devices triggered to send light transmissions. Continuing with this example, configuration module 104 therein may send light transmissions containing configuration data in regularly intervals or irregular intervals for a predetermined amount of time. In some embodiments, configuration module 104 therein may be configured by (e.g., by a datacenter operator or a receiver user) to change or modify the effects of such trigger events and/or a trigger proximity distance.

In step 304, computing device 102 or configuration module 104 therein may send configuration information to receiver 202 via a light transmission. For example, transmitter 200 may send an IR transmission using a series of IR pulses encoded using PPM, where the transmission may include a network address and/or other information to receiver.

In step 305, receiver 202 may receive and derive the configuration information from the light transmission. For example, receiver 202 may include a camera capable of detecting and interpreting IR transmissions. In this example, receiver 202 and/or the camera may be configured to derive an IP address and/or other information from an IR transmission. In another example, receiver 202 may include a camera capable of detecting and interpreting visible light transmissions. In this example, receiver 202 and/or the camera may be configured to derive an IP address and/or other information from a visible light transmission.

In step 306, receiver 202 may request additional information from computing device 102 using the derived configuration information. For example, receiver 202 may derive an IP address associated with computing device 102 from a light transmission sent by transmitter 200. In this example, receiver 202 may send a message for requesting data using the IP address associated with computing device 102. In another example, receiver 202 may derive a device identifier associated with computing device 102 from a light transmission sent by transmitter 200. In this example, receiver 202 may request data about computing device 102 from a management server where the device identifier is used to identify computing device 102 to the management server.

It will be appreciated that FIG. 3 is for illustrative purposes and that different and/or additional messages and/or actions may be used for providing computing device configuration information via a light transmission and/or related actions. It will also be appreciated that various messages and/or actions described herein with regard to FIG. 3 may occur in a different order or sequence.

Figure 4:
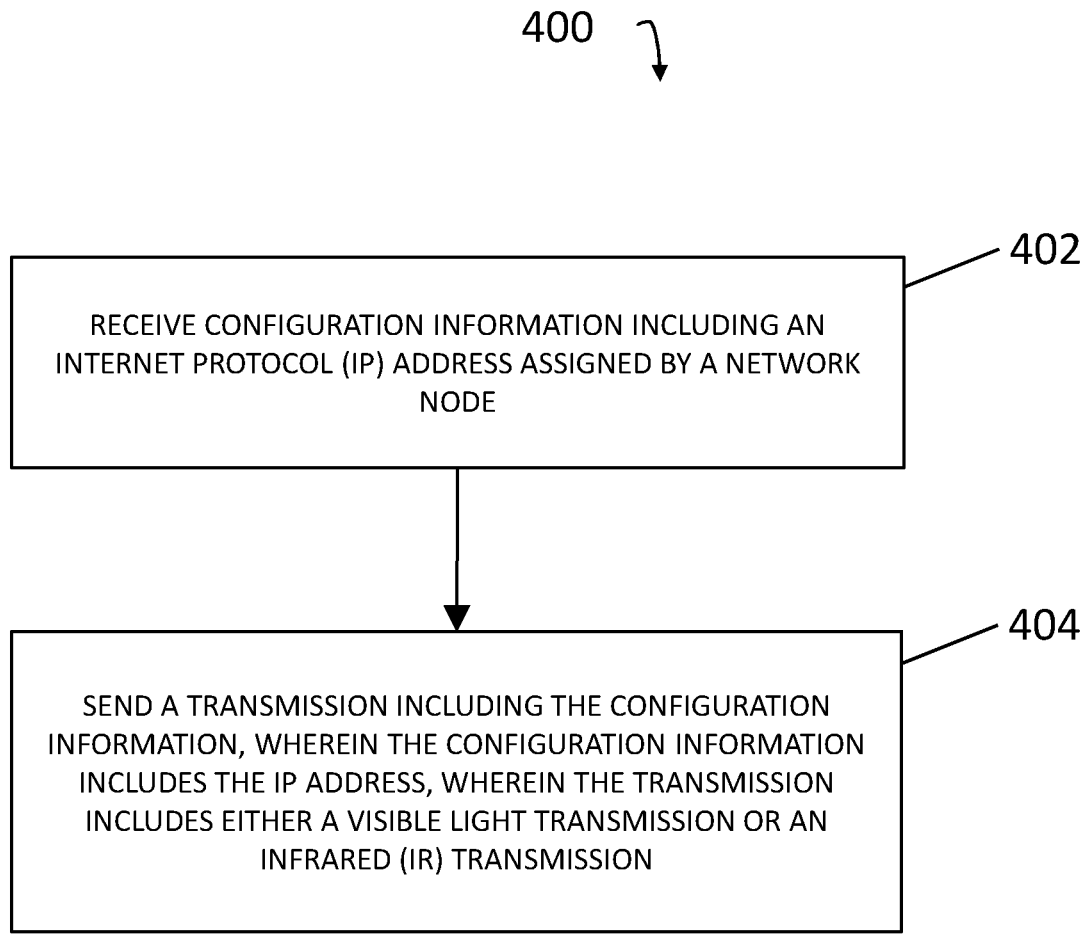
FIG. 4 is a diagram illustrating an example process for providing computing device configuration information via a light transmission.

FIG. 4 is a diagram illustrating an example process 400 for providing computing device configuration information via a light transmission. In some embodiments, process 400, or portions thereof, may be performed by computing device 102, configuration module 104, transmitter 200, and/or another node or module. In some embodiments, example process 400 may include steps 402 and/or 404.

Referring to example process 400, in step 402, configuration information may be received. The configuration information may include an IP address assigned by a network node (e.g., configuration node 108).

In step 404, a transmission including the configuration information may be sent, wherein the configuration information includes the IP address, wherein the transmission includes either a visible light transmission or an IR transmission.

In some embodiments, a receiver device (e.g., receiver 202) may be configured for receiving a transmission, deriving the configuration information from the transmission, and displaying, via a display, the configuration information.

In some embodiments, a receiver device (e.g., receiver 202) may send a request to a computing device for triggering the computing device to send a light transmission.

In some embodiments, a receiver device (e.g., receiver 202) may use configuration information (e.g., derived from a light transmission) to contact a computing device or another device for obtaining additional information associated with the computing device.

In some embodiments, a receiver device (e.g., receiver 202) may include a camera capable of detecting the visible light transmission or the IR transmission.

In some embodiments, a receiver device may include a mobile device, a handheld computer, a computer, or a smartphone.

In some embodiments, configuration information (e.g., transmitted via a light transmission) may include a MAC address, a parameter, a setting, application data, a parameter, a setting, application data, a serial number, a device identifier, an application protocol, a port number, an error code, an error message, status information, or a software version number.

In some embodiments, the transmission may be sent via at least one light emitter.

In some embodiments, a light transmission may be encoded using PPM, PWM, PDM, biphase modulation, ASK modulation, or FSK modulation.

It will be appreciated that process 400 may be for illustrative purposes and that different and/or additional actions may be used. It will also be appreciated that various actions described herein may occur in a different order or sequence.

It should be noted that computing device 102, configuration module 104, transmitter 200, and/or functionality described herein may constitute a special purpose computing device. Further, computing device 102, configuration module 104, transmitter 200, and/or functionality described herein can improve the technological field of network configuration and network management by using light transmissions for providing computing device configuration information. For example, by using light transmissions, a computing device with no displays can provide data to a mobile device (e.g., a smartphone with camera), whereby the mobile device can display the data to a user (e.g., a datacenter operator). In this example, if needed, the mobile device can use the received data to query the computing device or another entity for additional information.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing computing device configuration information via a light transmission, the method comprising:
at a computing device:
receiving configuration information for the computing device including an internet protocol (IP) address assigned to the computing device by a network node;
receiving, from a receiver device and at the computing device, a request for configuration information of the computing device, wherein the receiver device includes an optical reader; and
sending, in response to the request from the receiver device and by the computing device, a wireless light transmission including the configuration information, wherein the configuration information includes the IP address, wherein the wireless light transmission includes either a visible light transmission or an infrared (IR) transmission.

2. The method of claim 1 comprising:
at the receiver device:
receiving the wireless light transmission;
deriving the configuration information from the wireless light transmission; and
displaying, via a display, the configuration information.

3. The method of claim 1 wherein the receiver device uses the configuration information to contact the computing device or another device for obtaining additional information associated with the computing device.

4. The method of claim 1 wherein the receiver device includes a camera capable of detecting the visible light transmission or the IR transmission.

5. The method of claim 1 wherein the receiver device includes a mobile device, a handheld computer, a computer, or a smartphone.

6. The method of claim 1 wherein the configuration information includes a media access control (MAC) address, a parameter, a setting, application data, a serial number, a device identifier, an application protocol, a port number, an error code, an error message, status information, or a software version number.

7. The method of claim 1 wherein the wireless light transmission is sent via at least one light emitter.

8. The method of claim 1 wherein the wireless light transmission is encoded using pulse position modulation (PPM), pulse width modulation (PWM), pulse distance modulation (PDM), biphase modulation, amplitude-shift keying (ASK) modulation, or frequency-shift keying (FSK) modulation.

9. A system for providing computing device configuration information via a light transmission, the system comprising:
at least one processor; and
a computing device implemented using the at least one processor; the computing device configured for:
receiving configuration information for the computing device including an internet protocol (IP) address assigned to the computing device by a network node;
receiving, from a receiver device and at the computing device, a request for configuration information of the computing device, wherein the receiver device includes an optical reader; and
sending, in response to the request from the receiver device, a wireless light transmission including the configuration information, wherein the configuration information includes the IP address, wherein the wireless light transmission includes either a visible light transmission or an infrared (IR) transmission.

10. The system of claim 9 comprising:
the receiver device configured for:
receiving the wireless light transmission;
deriving the configuration information from the wireless light transmission; and
displaying, via a display, the configuration information.

11. The system of claim 9 wherein the receiver device uses the configuration information to contact the computing device or another device for obtaining additional information associated with the computing device.

12. The system of claim 9 wherein the receiver device includes a camera capable of detecting the visible light transmission or the IR transmission.

13. The system of claim 9 wherein the receiver device includes a mobile device, a handheld computer, a computer, or a smartphone.

14. The system of claim 9 wherein the configuration information includes a media access control (MAC) address, a parameter, a setting, application data, a serial number, a device identifier, an application protocol, a port number, an error code, an error message, status information, or a software version number.

15. The system of claim 9 wherein the wireless light transmission is sent via at least one light emitter.

16. The system of claim 9 wherein the wireless light transmission is encoded using pulse position modulation (PPM), pulse width modulation (PWM), pulse distance modulation (PDM), biphase modulation, amplitude-shift keying (ASK) modulation, or frequency-shift keying (FSK) modulation.

17. A non-transitory computer readable medium comprising computer executable instructions that when executed by at least one processor of a computer cause the computer to perform steps comprising:
at a computing device:
receiving configuration information for the computing device including an internet protocol (IP) address assigned to the computing device by a network node;
receiving, from a receiver device and at the computing device, a request for configuration information of the computing device, wherein the receiver device includes an optical reader; and
sending, in response to the request from the receiver device and by the computing device, a wireless light transmission including the configuration information, wherein the configuration information includes the IP address, wherein the wireless light transmission includes either a visible light transmission or an infrared (IR) transmission.

18. The non-transitory computer readable medium of claim 17 wherein the wireless light transmission is encoded using pulse position modulation (PPM), pulse width modulation (PWM), pulse distance modulation (PDM), biphase modulation, amplitude-shift keying (ASK) modulation, or frequency-shift keying (FSK) modulation.

* * * * *